Oct. 24, 1967     L. F. ALBRIGHT ET AL     3,348,909
PROCESS FOR PRODUCTION OF ALKALI METAL NITRATES AND CHLORINE
Filed June 8, 1965
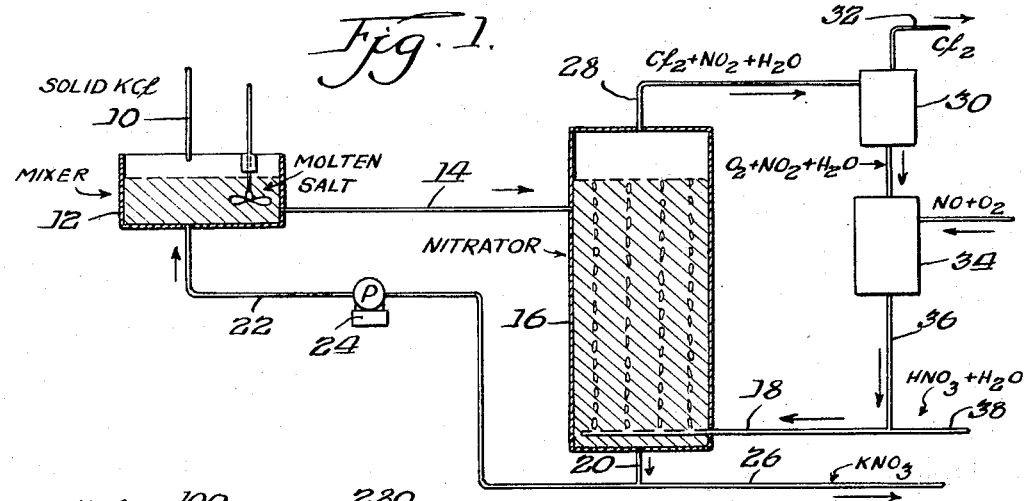
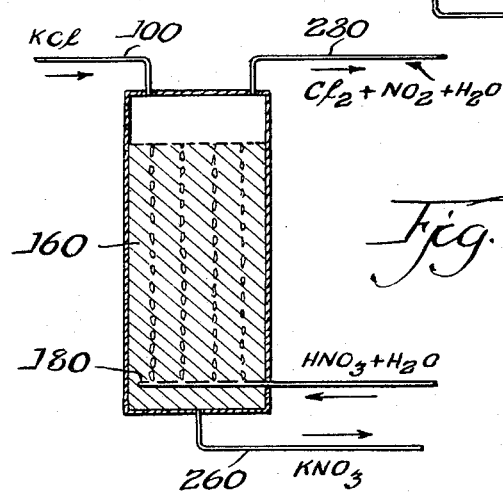
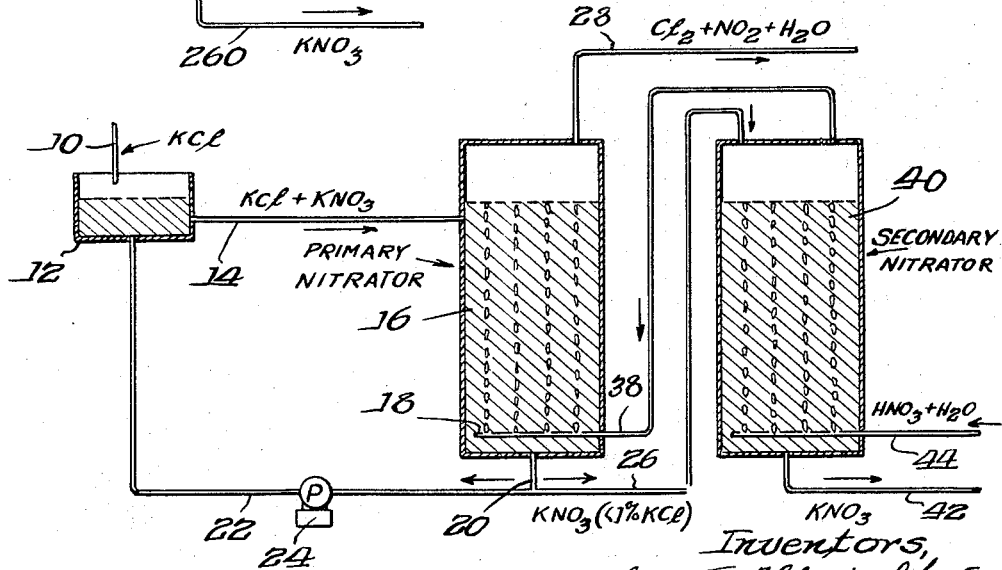
Inventors,
Lyle F. Albright &
Hans F. Haug.

3,348,909
PROCESS FOR PRODUCTION OF ALKALI METAL NITRATES AND CHLORINE
Lyle F. Albright, Lafayette, Ind., and Hans F. Haug, Landenberg, Pa., assignors to Purdue Research Foundation, Lafayette, Ind., a corporation of Indiana
Filed June 8, 1965, Ser. No. 462,261
23 Claims. (Cl. 23—102)

ABSTRACT OF THE DISCLOSURE

A process in which a large mass of molten alkali metal nitrate is used to dissolve chloride of the corresponding alkali metal into which nitric acid is separately added so that the reactants will intimately mix in the mass and rapidly combine at a temperature below that at which the nitric acid thermally decomposes to form additional alkali metal nitrate and a gaseous product consisting essentially of elemental chlorine, nitrogen oxide and steam and substantially free of chlorides such as HCl and NOCl which characterize prior processes.

---

This invention relates to a novel and improved process for manufacturing alkali metal nitrates and notably potassium nitrate.

It is known to produce potassium nitrate by the reaction of nitric acid with the corresponding alkali metal chloride. However, in the past the by-product from this reaction would comprise largely hydrogen chloride or a mixture of non-condensible gases including the nitrogen oxides, nitrosyl chloride and only to a minor extent chlorine.

It is a feature of the present invention, however, that we have devised a process for manufacturing alkali metal nitrates from the reaction of nitric acid with the corresponding alkali metal chloride while obtaining a high yield of elemental chlorine and with little or no hydrogen chloride or nitrosyl chloride.

We have found quite unexpectedly that, when solid alkali metal chloride and hot nitric acid vapors are reacted by dissolving them into a much larger mass of molten alkali metal nitrate, the reaction can be caused to take place at considerably lower temperatures than previously thought practical.

This not only means that the process operating costs can be lowered, but we have found that we are able to conduct the reaction at temperatures below that at which there is any appreciable thermal decomposition of the nitric acid. This provides the real advantages of being able to obtain a gaseous product that contains elemental chlorine in appreciable quantities. Of the total chlorine in the gas stream, 60 to 100% is present as elemental chlorine. Furthermore, we have found that the balance of gases in said gaseous by-product will comprise nitrogen dioxide and water and with little or no hydrogen chloride or nitrosyl chloride present therein. Some oxygen formed from the decomposition of a small fraction of the nitric acid may also be present. After separating out the chlorine, the remaining gases can be usefully reformed to nitric acid, for example, by using nitric oxide and oxygen in a manner well known to those skilled in this art. This reformed nitric acid can then be used to react with further alkali metal chloride in a continuance of the process.

A further feature of our invention is that although we prefer to use relatively high concentrations of nitric acid in the order of 60–70%, we have found that the presence of water in larger quantities does not detrimentally affect the process. Rather, we have found that the reaction proceeds more or less independently of the water content. We have further found that when using more diluted concentrations of nitric acid and also, when operating at pressures greater than one atmosphere, we are able to further lower the operating temperatures at which the reaction can be caused to take place without substantially affecting the high yield of alkali metal nitrate and elemental chlorine which characterizes our invention.

Thus, it is a feature of our invention, which was a totally unexpected finding, that when we conduct the reaction in the range from about 200–250° C., we are able to obtain approximately 50% conversion of nitric acid to the corresponding nitrate plus almost complete conversion of the chlorine from the chloride salt as elemental chlorine. When we increase the operating temperature over 300° C. and especially up to 350° C., there is an accompanying somewhat lower conversion of the nitric acid to the alkali metal nitrate. However, the conversion of the chloride salt to elemental chlorine increases to 100%. At temperatures less than 200° C., a portion of the chloride salt converts to hydrogen chloride and more than 50% of the nitric acid may be converted to the alkali metal nitrate.

Thus, it is a feature of our invention that we are able to control the yield of elemental chlorine relative to the yield of alkali metal nitrate by appropriately selecting the temperature and pressure at which we react the alkali metal chloride with the nitric acid.

As is well known, the alkali metal nitrates have utility in a wide variety of industrial processes. Potassium nitrate in particular has great potential as a fertilizer in that it contains two of the three important plant nutrients (nitrogen and potash). To date, however, it has not been extensively used for agronomical purposes because of its high unit cost. Chlorine is also a chemical widely used by industry. However, in the past it has been manufactured usually by electrolysis of sodium chloride. This is a cheap and reliable process but unfortunately also one which produces great quantities of sodium hydroxide or caustic soda. In general, the demand for chlorine far outstrips the demand for caustic soda, and the economies of the situation work against the manufacture of chlorine by the electrolysis method.

It is therefore a principal object of the present invention to provide a process wherein elemental chlorine and alkali metal nitrates are obtainable in good supply as the principal products of a reaction between the corresponding alkali metal chloride and nitric acid and which process is accompanied by a minimum of undesired by-products.

A further object is to provide such a process which may also be operated in a continuous manner and so as to produce both potassium nitrate and elemental chlorine at conversion rates sufficiently high that the process is economically practicable and is otherwise adaptable for commercial installations.

In accordance with these objects, it is a feature of the invention that solid alkali metal chloride, such as the aforementioned potassium chloride, is converted to the corresponding alkali metal nitrate by dissolving the potassium chloride into a larger mass of molten potassium nitrate and contacting the melt of molten potassium nitrate containing dissolved potassium chloride with hot nitric acid vapors or cold nitric acid liquid. Most of the nitric acid thereupon dissolves into the melt and reacts with the potassium chloride. The molten potassium nitrate comprising the solvents for the reactants is maintained at a temperature selected in accordance with whether a maximum conversion of the potassium chloride to elemental chlorine or to the nitrate salt is required. In accordance with the invention such a temperature will be ordinarily within the range of about 310°–250° C., assuming atmospheric conditions. This represents the useful range of temperatures within which mixtures of potassium nitrate and its chloride (up to about 15 mole percent) can form a melt in which the reactants represented by potassium chloride and nitric acid can be dissolved. (The eutectic mixture of potassium nitrate and potassium chloride contains about 6 mole percent potassium chloride and melts at approximately 310° C.) It also represents a range of temperatures of the molten mixture into which nitric acid vapors can readily dissolve without undue thermal decomposition of the nitric acid. This, we have found is critical in order to obtain elemental chlorine rather than hydrogen chloride, for example, as the principal by-product gas.

By adding water as through the use of a diluted nitric acid and/or operating under pressurized conditions greater than one atmosphere the lower limit of this temperature range can be further reduced. Also, by using mixtures of alkali metal chlorides and nitrates, for example chlorides and nitrates of sodium and potassium, this operating range can be further reduced. Where salt mixtures containing potassium, sodium and lithium salts comprise the slurry the operating temperature can be reduced to as low as 150° C. and still obtain excellent yields of the corresponding alkali metal nitrates and elemental chlorine.

In one form of the invention, solid alkali metal chloride particles are added at the top of a vertical reactor column containing a relatively large mass of molten potassium nitrate so that they slowly penetrate the molten slurry comprising a mixture of molten potassium nitrate and potassium chloride dissolving thereinto and maintaining the described mixture having a melting point below 350° C. The melt mixture of alkali metal nitrate and dissolved alkali metal chloride is contacted with nitric acid added at the bottom of the column. The nitric acid may be added either as hot vapors or as a cold liquid which is quickly heated and vaporized by the hot melt. The hot gases bubble upwardly through the dissolving potassium chloride and in their counterflow intimately contact the dissolving solid salt particles so as to obtain a rapid conversion to potassium nitrate and elemental chlorine. In accordance with our understanding of the reaction, generally only a portion of the nitric acid (up to a maximum of 50%) reacts with the dissolved potassium chloride to produce potassium nitrate and hydrogen chloride. The hydrogen chloride at the temperatures of the reaction immediately redissolves into the solution and reacts with other nitric acid to produce the exhaust gases consisting largely of chlorine and smaller amounts of nitrogen dioxide and water. The basic overall reaction is essentially as follows:

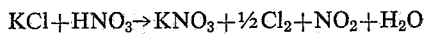

$$KCl + HNO_3 \rightarrow KNO_3 + \tfrac{1}{2}Cl_2 + NO_2 + H_2O$$

A small amount of the nitric acid depending on the operating temperatures and duration of contact may decompose as follows:

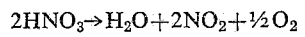

$$2HNO_3 \rightarrow H_2O + 2NO_2 + \tfrac{1}{2}O_2$$

In accordance with the invention, however, this is held to a minimum. The reactions proceed rapidly at the indicated temperatures of the molten slurry and, in fact, inversely to the temperature. This is to say that the speed of the reactions appears to quicken with the lowering of the temperature toward the lower limit. The forming gases are collected at the top of the column and withdrawn therefrom at a rate substantially as rapidly as they are produced, so as to prevent any reconversion of the forming chlorine with the potassium nitrate back to potassium chloride as well as to avoid other undesirable side reactions. The forming elemental chlorine and nitrogen dioxide of which the exhaust gases are essentially comprised, are however essentially non-reactive with each other and with the melt. The process is therefore particularly adapted to be run on a continuous basis by adding potassium chloride to the slurry and withdrawing the exhaust gas and amounts of the potassium nitrate in accordance with the rate at which the chloride is being added to the top of the column. The process is therefore well adapted as a continuous flow operation.

Referring therefore now to the drawings from which a more complete understanding of the invention will be obtained:

FIGURE 1 illustrates in schematic form a preferred embodiment of the invention employing continuous stream of molten alkali metal substrates;

FIGURE 2 illustrates an alternative embodiment; and

FIGURE 3 illustrates a third arrangement for practicing the invention wherein a secondary nitrator is also employed.

Referring therefore first to FIGURE 1, in this embodiment alkali metal chloride, such as potassium chloride, is prepared in finely ground, pelleted or powdered solid form and added at 10 into a mixer 12, which with agitation it enters and is combined with a stream of molten potassium nitrate flowing via line 14 into the top of a vertical column or reactor vessel 16. Connected into the base of said vessel 16 is a line 20 through which the stream of molten potassium nitrate flows back to mixer 12 via line 22 so that the system is characterized by a continuously circulating stream of molten alkali metal nitrate. At 24 in line 22 is a pump for enforcing continuous circulation or flow of the thus described continuous stream of molten potassium nitrate. If required, a pump may also be provided in line 14.

Hot nitric acid vapors and steam or cold nitric acid and water are continuously added at the base of the reactor vessel via a perforated nozzle or other appropriate device 18, located immediately above exit 20 to provide a counterflow of the hot nitric acid vapors and steam. These bubble upwardly through the slurry comprising the molten potassium nitrate and potassium chloride dissolving therein, so as to intimately intermingle therewith and rapidly convert the potassium chloride to potassium nitrate and simultaneously produce the described exhaust gases consisting largely of chlorine, nitrogen dioxide and water, and possibly a small amount of oxygen. These exhaust gases collect at the top of the reactor vessel and are immediately withdrawn through line 28 substantially as fast as they are formed and exit from the level of the molten salt mixture in reactor vessel.

Reactor vessel 16 and its contents are heated by any suitable means, such as gas or other fuel-fired furnace, so as to maintain a temperature at which the mixture of alkali metal chloride and nitrates melt to provide the solvent into which the nitric acid readily dissolves but below a temperature at which any appreciable thermal decomposition of the nitric acid occurs. Preferably, an amount of powdered potassium chloride is added at 10 so as to maintain a mixture in the reactor vessel 16 comprising from 6–15 mole percent of the potassium chloride. Although pure potassium chloride melts at about 780° C. and the potassium nitrate at about 335° C., we have found that the melting point of a mixture comprising less than 15% potassium chloride, will melt at a temperature below 350° C., whereas a mixture containing 6 mole percent of potassium chloride (which is the eutectic mixture) will have the lowest melting point which is about 310° C., considering in each instance a 1 atmosphere pressure. 350° C. is considered to be the maximum temperature at which the reaction may be operated since at temperatures above 350° C. we have found that there is considerable thermal decomposition of the nitric acid. Thermal decomposition of the nitric acid detrimentally affects the conversion to chlorine. A eutectic mixture of the two alkali metal salts comprising about 6 mol percent of potassium chloride has the lowest melting point. For this reason it is preferred that the temperature maintained in the reactor vessel 16 be held below 335° C. This is on an assumption that the nitric acid is added in a concentration of approximately 60–

70% or higher. However, where water or more diluted grades of nitric acid are utilized and/or where the reaction in vessel 16 is conducted above atmospheric pressure, further reductions in the operating temperature are possible.

At the preferred operating temperatures of 200–300° C., the overall reaction of the nitric acid vapors and steam with the mixture of fused alkali metal nitrates and chlorides is represented by the following equation:

$$2HNO_3 + KCl \rightarrow KNO_3 + H_2O + NO_2 + \tfrac{1}{2}Cl_2$$

The nitrate ions of the nitric acid exchange with the chloride of the potassium chloride adding to the circulating stream in the form of additional molten potassium nitrate and an essentially pure potassium nitrate product is drawn off the stream below the entering nitric acid vapors via line 26 so as to maintain the molten salt stream at a constant level.

The elemental chlorine and other exhaust gases which collect at the top of the reactor vessel 16 and constitute by products of the reaction in vessel 16 are led via line 28 into a separator 30 where the gases are treated to permit separation of the chlorine at 32 as a second product of the process. The remaining gases comprising principally nitrogen dioxide and water plus any oxygen present are led to a reformer 34 where they are reformed to nitric acid by the supplying of nitric oxide and more oxygen, utilizing processes well known to those skilled in the art. It will be understood that the specific details by which both the separating and reforming process are operated at 30 and 34 comprise no portion of the herein claimed invention, and will be conducted according to processes already well known to those skilled in the art. The reformed nitric acid which exits from 34 is combined with nitric acid added at 38 and is returned to the reaction vessel 16 via nozzle 18.

The product discharging through line 26 is essentially pure potassium nitrate (less than 1% KCl). However, in order to remove any possible traces of potassium chloride which may be mixed therewith, the product may be further purified by connecting line 26 into the top of a secondary nitrator 40 as illustrated in FIGURE 3. In said FIGURE 3 secondary nitrator 40 comprising a column packed with an inert packing material so as to provide good countercurrent contact between the molten potassium nitrate which enters through the top of the vessel 40 from line 26 and the hot nitric acid vapor and steam which is added to the base of said vessel 40 via line 44 and flows countercurrent to the descending molten alkali metal nitrate. The nitric acid vapors plus steam thus intermingle and react with traces of alkali metal chloride present in the molten potassium nitrate to produce a more purified form of potassium nitrate which is collected via line 42. In the secondary nitrator 40, the reaction between the nitric acid and potassium chloride traces in the potassium nitrate produce a mixture of exhaust gases which are collected and carried with the hot nitric acid vapor and steam into line 38 and therethrough for discharge in the reactor vessel 16 via nozzle 18. In turn they are collected with the exhaust gases through line 28. As previously described, the portion thereof constituting chlorine gas is separated out with the chlorine from the reactor vessel 16 at 32 and the remainder is reformed into nitric acid in device 34. Provision may also be provided in device 34 for discharging unuseable impurities and other gases detrimental to the rapid conversion occurring in vessel 16.

Conceivably in place of the reactor column of molten salt comprising vessel 16 as thus far described, other reactors might be used in place thereof. Thus, countercurrent contacting of the molten salt slurry containing solid alkali metal chloride by gaseous nitric acid could be obtained utilizing a packed column, a bubble-cap column, sieve plate column or the like. Gaseous nitric acid may also be bubbled upwardly through the molten salt mixture held in a tank and/or with mechanical agitation. Centrifugal type pumps as well as other conventional liquid-gas contacting devices may also be used.

For example, in FIGURE 2 an alternate arrangement is illustrated wherein the mixer and primary nitrator are combined in a single vessel 160. In this embodiment of the invention, fresh alkali metal chloride in powdered form is added via line 100 directly to the top of the reactor vessel containing the molten alkali metal nitrate. As in the FIGURE 1 embodiment, the nitric acid is added at 180 in the base of the vessel and bubble upwardly through the molten salt mixture. In this alternate arrangement, the bubbling nitric acid vapors and steam are further relied upon to keep the freshly added potassium chloride in suspension until it goes into solution in the mixture of molten potassium nitrate and potassium chloride. For the successful operation of this alternative arrangement, the fresh powdered alkali metal chloride must be initially ground sufficiently fine as to readily and rapidly dissolve into the slurry and only slowly settle to the bottom in any substantial quantity. Importantly, the potassium chloride must substantially completely react with the countercurrent flowing nitric acid vapors to produce the desired relatively pure alkali metal nitrate product which is discharged from the base of the vessel via line 260. In this reaction, as described, exhaust gases consisting of elemental chlorine, nitrogen oxide, water and possibly some small amounts of oxygen are also given off and these are collected via line 280 at the top of the vessel 160 and led to a separator such as 30 in FIG. 1 for separation of the chlorine gas. As in the embodiment of FIGURE 1, the gases remaining after removal of element chlorine are preferably reformed to nitric acid and returned with additional amounts of nitric acid to the base of the vessel 116 to continue the reaction. The molten product, which is drawn off the bottom of the column at 260 below the entering nitric acid vapors, will also be of an essentially pure form assuming the height of the column is sufficiently long to assure substantially complete dissolution of the potassium chloride into the slurry and reaction with the entering counter-current flowing nitric acid vapors. However, this product may be further treated by utilizing the secondary nitrator of FIGURE 3 which has been described above in connection with FIGURE 1, to remove all traces of potassium chloride which might be present in the withdrawn potassium nitrate product.

It is generally recognized that simple salts such as alkali metal nitrates and chlorides in the molten state, consists of freely mobile cations and anions (Research 2,362 (1949), J. Chem. Ed., 39, 59 (1962), Acta Physicochim. USSR, 20, 411 (1945), J. Chim. Phys., 56, 302 (1959). Mixtures of such compounds are thermodynamically almost ideal.

Molten nitrates and chlorides of alkali metal in the fused state have also been extensively investigated. Heat capacities, latent heats, melting points and densities are known (Gmelins Handbuck der Anorganischen Chemic, 8, Aufl. Verlag Chemie, Berlin, 1938, Landolt-Boernstein, Zahlenwerte und Funktionen, 6, Aufl. Springer-Verlag, Berlin, 1961, Circular 500, National Bureau of Standards, U.S. Dept. of Commerce, Washington, 1952, International Critical Tables, McGraw-Hill Book. Inc., New York, 1927). Phase diagrams are available for KNO$_3$-KCl (Suhr. Obschei Khim., 25, 2414 (1955).

The results of our investigation bear out that the overall reaction of the nitric acid vapor with the mixtures of fused alkali in vessel 16 of FIGURE 1 and 160 of FIGURE 2 when conducted at temperatures of between 200° and 350° C., is represented by the previously recited equation $$2HNO_3 + Cl^- \xrightarrow{K} NO_3^- + H_2O + NO_2 + \tfrac{1}{2}Cl_2$$

Thermal decomposition of nitric acid competes with this reaction and becomes important at temperatures above 300° C. Our experience with the molten alkali metal nitrates as solvents for the reactants indicates that the mixtures containing up to 15 mol percent of the potassium chloride are good solvents for both water and nitric acid. The reaction of the nitric acid occurs mainly in the bulk of the liquid between the chloride ions and the dissolved acid. The conversion of the nitric acid to nitrate ions does not exceed 50% (in the range of temperatures from about 200–250° C.) and lessens with increases in temperature. This may be explained if the absorption of nitric acid vapors by the molten salt slurry is considered to represent a plural step chemical reaction as follows:

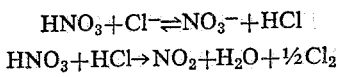

$$HNO_3 + Cl^- \rightleftharpoons NO_3^- + HCl$$
$$HNO_3 + HCl \rightarrow NO_2 + H_2O + \tfrac{1}{2}Cl_2$$

The first of these reactions is reversible while the second is essentially irreversibe. The hydrogen chloride formed in the first reaction with the potassium nitrate is believed to immediately dissolve into the molten salt slurry. If additional nitric acid is present, the hydrogen chloride will react irreversibly by the second reaction to produce nitrogen dioxide, water and, to the greatest extent, elemental chlorine. If no additional nitric acid is present, the hydrogen chloride will react with the nitrate salt as indicated by the reverse of the first reaction to reform the chloride salt plus nitric acid which quickly decomposes to nitrogen dioxide, water, and elemental oxygen. The reaction of hydrogen chloride with a nitrate salt can be utilized for a novel Deacon process. In the first step the hydrogen chloride is contacted with a melt of nitrate salt, and some chloride salt will be produced in the melt as indicated by the reverse of the first reaction. Subsequent contacting of this melt containing some chloride salt with nitric acid will reform the nitrate salt from the chloride salt, and in addition will produce elemental chlorine by a combination of the first reaction in a forward direction and the second reaction, both shown above. Hence the net effect is a novel method for the oxidation of hydrogen chloride to elemental chlorine.

Although the above is believed to explain why elemental chlorine is the principal gaseous product rather than hydrogen chloride of the prior art, we have also noted that the freezing data for solutions of water and nitric acid in our fused nitrate salts gives indication that both the water and nitric acid dissociate in the molten salt solution. The dissociation of nitric acid my conceivably produce nitronium ions and on the basis of this hypothesis an alternate reaction mechanism can be suggested as follows:

$$HNO_3 = NO_2^+ + OH^-$$
$$NO_2^+ + Cl^- = NO_2 + \tfrac{1}{2}Cl_2$$
$$HNO_3 + OH^- = H_2O + NO_3^-$$

The general rate of reaction of the nitric acid with the chloride ions depends largely upon the rate of mass transfer from the vapor phase to liquid phase and increases with increasing nitric acid and chloride concentrations, decreasing with increasing temperature. Operating the reaction under pressure results in water being dissolved in the molten salt slurry. As a result, the melting point of the salt can be reduced significantly. Operation at lower temperatures tends to result in less undesirable decomposition of nitric acid. At sufficiently low temperatures, hydrogen chloride would be probably be produced instead of chlorine. Operation of the reactor vessel 16 at 200–400 p.s.i. should permit temperature reductions as low as 150° C. to produce highest yields of potassium nitrate. At such low temperatures, conversions of the nitric acid to the corresponding nitrate salts can be increased. Thus if alkali metal nitrate is the desired product, lower temperatures are utilized. As stated, lower temperatures can be achieved in a potassium nitrate-potassium chloride melt, for example, by increasing the pressure to dissolve more water and nitric acid into the molten salt slurry. The increased conversion of nitric acid to alkali metal nitrates however decreases the elemental chlorine produced. At high temperatures, near the upper level of 350° C., chlorine is produced at the expense of nitrate per mole of nitric acid converted. The optimum operating conditions observed in reactor 16 or 160 will therefore be a function of market demand.

Although the invention has thus far been described in connection with the conversion of potassium chloride to potassium nitrate, the process is equally useful for the production of any of the alkali metal nitrates by the conversion of the corresponding alkali metal chlorides with the nitric acid. Thus the invention is useful to produce nitrate salts of sodium, lithium, cesium and rubidium by the reaction of nitric acid vapors and steam with the corresponding alkali metal chloride. The process also is useful to convert calcium chloride to calcium nitrate and may be used for converting various minerals to the corresponding nitrates. Examples thereof will include halite, sylvite and sylvinite ores. Also mixtures of two or more alkali metal chlorides may be converted to a corresponding mixture of alkali metal nitrates. Reactions involving these other alkali metal salts and mixtures can be conducted at still lower temperatures. Thus, although pure potassium nitrate melts at 335° C. and sodium nitrate melts at 330° C., eutectic mixtures of sodium nitrate-potassium nitrate can be provided which melts at 250° C. and eutectic mixtures of potassium, sodium and lithium nitrates which melts at 150° C. In this connection, we have noted that the reaction with nitric acid is faster in potassium salts than in sodium salts, and reactions in eutectic mixtures containing lithium salts proceed most rapidly. Similarly in place of hot nitric acid vapors in steam, liquid or fuming nitric acid may be used as the nitrator.

*Example 1*

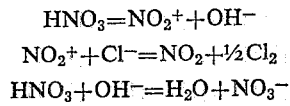

In this example, parts given are in parts by weight unless otherwise indicated. The reaction apparatus consists of a Pyrex tube 520 mm. long and 47 mm. ID. The column is wound with Nichrome, wired for heating and wrapped with asbestos paper for insulation. A gas inlet tube, 5 mm. ID enters the column 70 mm. above the lower end and runs downward to 10 mm. from the bottom. A 7 mm. ID outlet tube runs off the column top. A nitric acid reservoir is pressured with nitrogen. The acid flows through a rotameter to a vaporizer and from the vaporizer to the reaction column. The top outlet from the column is connected to 3 absorption flasks via a 3-way stopcock.

Molten salt mixtures used contain about 4.5 weight percent potassium chloride, 95.5 weight percent potassium nitrate and are prepared by filling the reactor with the KNO₃, and applying heat until it melts. Solid KCl is added and a small stream of nitrogen is fed into the bottom for gentle agitation. After the KCl has been dissolved, samples are analyzed for chloride content. The absorbers are filled with concentrated sulfuric acid or sodium hydroxide. The molten salt temperature is adjusted to the desired level. The nitric acid vapors are switched into the reactor and the nitrogen flow is cut off. Acid vapors are passed in until all or nearly all of the chloride is converted to nitrate. Salt samples are taken and analyzed at the end of the run. Between runs fresh salt is added to compensate for samples withdrawn and for the chloride converted to nitrate. The conversions reported in the following table for Runs A to Y are defined as the mole of alkali metal nitrate produced for mole of nitric acid fed to the reactor.

| Run No. | Initial Comp. of Melt Mole (percent) | Melt Temp. (°C.) | Amount Melt (g.) | HNO₃ (weight percent) | Flow Rate (g./min.) | Time (min.) | Conversion (percent) |
|---|---|---|---|---|---|---|---|
| A | KNO₃—6.15 KCl | 348 | 500 | 68 | 1.0 | 10 | 37 |
| B | KNO₃—6.08 KCl | 347 | 500 | 68 | 0.34 | 20 | 26 |
| C | KNO₃—6.19 KCl | 350 | 500 | 68 | 1.36 | 10 | 37 |
| D | KNO₃—5.91 KCl | 352 | 500 | 68 | 1.34 | 6 | 35 |
| E | KNO₃—6.02 KCl | 352 | 500 | 68 | 0.63 | 10 | 32 |
| F | KNO₃—6.07 KCl | 350 | 500 | 68 | 1.27 | 10 | 40 |
| G | KNO₃—6.11 KCl | 349 | 500 | 68 | 0.31 | 20 | 26 |
| H | KNO₃—6.39 KCl | 352 | 1,000 | 68 | 0.40 | 20 | 23 |
| I | KNO₃—6.05 KCl | 348 | 1,000 | 68 | 1.14 | 15 | 35 |
| J | KNO₃—6.08 KCl | 350 | 1,000 | 68 | 0.77 | 20 | 30 |
| K | KNO₃—6.28 KCl | 351 | 1,000 | 68 | 0.61 | 16 | 17 |
| L | KNO₃—6.12 KCl | 350 | 1,000 | 68 | 0.61 | 25 | 19 |
| M | KNO₃—6.17 KCl | 350 | 1,000 | 30 | 0.26 | 30 | 24 |
| N | KNO₃—6.08 KCl | 350 | 1,000 | 98 | 1.50 | 10 | 28 |
| O | KNO₃—6.08 KCl | 352 | 250 | 68 | 0.98 | 6 | 28 |
| P | KNO₃—6.12 KCl | 350 | 1,500 | 68 | 0.88 | 20 | 23 |
| Q | KNO₃—6.17 KCl | 352 | 1,500 | 68 | 0.50 | 40 | X |
| R | (Na, K) (NO₃, Cl) Na+54.3, K+45.7—6.28 Cl— | 352 | 1,000 | 68 | 0.50 | 20 | 18 |
| S | (Na, K) (NO₃, Cl) Na+54.3, K+45.7—6.10 Cl— | 252 | 1,000 | 68 | 0.56 | 20 | 48 |
| T | (Na, K) (NO₃, Cl) Na+54.3, K+45.7—5.93 Cl— | 216 | 1,035 | 46 | 0.55 | 60 | 46 |
| U | (Na, K) (NO₃, Cl) Na+54.3, K+45.7—6.10 Cl— | 250 | 1,040 | 47 | 0.60 | 70 | 46 |
| V | (Na, K) (NO₃, Cl) Na+54.3, K+45.7—5.97 Cl— | 216 | 1,050 | 47 | 0.27 | 140 | 47 |
| W | (Na, K) (NO₃, Cl) Na+54.3, K+45.7—5.97 Cl— | 216 | 1,055 | 63 | 0.46 | 60 | 48 |
| X | (Na, K) (NO₃, Cl) Na+54.3, K+45.7—5.47 Cl— | 216 | 1,060 | 28 | 0.45 | 56 | 45 |
| Y | (Na, K) (NO₃, Cl) Na+54.3, K+45.7—6.01 Cl— | 216 | 1,060 | 68 | 0.47 | 70 | 49 |

X Product absorbed in 8 fractions

| Time, minutes | 0 | 5 | 10 | 16 | 20 | 25 | 30 | 35 | 40 |
|---|---|---|---|---|---|---|---|---|---|
| Conversion, percent | 0 | 5 | 16 | 26 | 30 | 26 | 25 | 23 | 22 |

In Runs A–J the flow rate of the nitric acid vapor and the total amount of molten salt present in the reactor were varied while keeping the acid concentration and temperatures essentially constant. The conversion of the nitric acid which is defined as the moles of chloride salt converted to nitrate salt per moles of nitric acid HNO₃ fed into the reactor represents the results of each run. The results of these tests indicated a conversion range from 23 to 40%, the higher conversion rates generally accompanying higher flow rates, although there was a certain amount of random fluctuation. The amount of molten salt, or equally the height of the salt column in the reactor, did not seem to have any appreciable effect.

In runs K and L when the connecting line between the vaporizer and the reactor was overheated so as to raise the temperature of the nitric acid vapor to above 350° C., a conversion decrease to 17–19% was noted as compared to 25–30% for similar runs without preheating. The detrimental effect of the thermal decomposition of nitric acid on the reaction with chloride salt is therefore evident.

Run M was made with dilute nitric acid and Run N with almost anhydrous acid. In both cases the conversion was not significantly different from that obtained with azeotropic acid.

In Runs O and P a small amount (250 g.), and the largest possible amount (1500 g.) of salt were used in the reactor. The conversion was noticeably smaller when the height of the salt column was increased.

Run Q with the reactor filled with an intermediate amount (1000 g.) of melt was used to determine how the conversion changed as a function of time during the reaction. As is indicated in the table, the conversion increased during the first 20 minutes of the run. In the next 20 minutes, the conversion decreased.

Quaternary salt mixes were used for Runs R–Y. Run R at 352° C. showed a markedly lower conversion than runs with pure potassium salts under similar conditions. At 216 and 250° C. the conversion in all cases was between 45 and 49% irrespective of any variations in acid flow rate or concentration. Solid sodium chloride was noticed as present in the melt at the start of all runs conducted at 216° C. However, by the end of the run the crystals usually had disappeared completely. Thus, the liquid composition during these runs was more or less constant.

Run Y was used to identify the gaseous reaction products. During the first 50 minutes of the run the product vapors were absorbed as usual in the sodium hydroxide solution. It was postulated that after this time a pseudo-steady state would have been established in the reactor and the vapor composition would change only slowly. For the next 20 minutes, the vapors were then directed to a second absorption train consisting of two flasks with concentrated sulfuric acid and one flask with sodium hydroxide solution all connected in series. After purging the absorption train with nitrogen gas for about one hour, the contents of the two flasks with sulfuric acid were joined and analyzed for total nitrogen, nitrite and total chlorine content. The hydroxide solution was analyzed for total chlorine, free chlorine and total nitrogen content. The following results were obtained:

In sulfuric acid:
    Total nitrogen _____ 2.75 g. HNO₃.
    Nitrite _____ 1.20 g. HNO₃.
    Total chlorine _____ Traces.

In sodium hydroxide:
    Total chlorine _____ 1.53 g. Cl₂.
    Free chlorine _____ 1.74 g. Cl₂.
    Total nitrogen _____ 0.23 g. HNO₃.

The apparent discrepancy between total chlorine and free chlorine content in the hydroxide solution is considered to be caused by the presence of nitrite in the solution; since nitrite ions interfere with the determination of free chlorine.

*Example II*

Molten salt is contained in one liter cylindrical, round bottom reaction flask fitted with a head having five openings, 40 mm. ID in the center, 2.25 mm. ID on opposite sides and 2.9 mm. ID on the remaining sides. An agitator of Haynes Alloy No. 25 in the form of a 4 blade turbine type impeller of 50 mm. diameter is fitted in the center opening. A 6 mm. ID gas inlet tube enters one 25 mm. opening and a dip tube extending to reactor bottom enters the other one. The two small openings are used for gas outlet and a thermocouple well. Nitric acid is vaporized and regulated as in Example I. The salt mixture is converted to the molten state outside the reactor; then added to the heated reactor. When a steady state is obtained in the nitric acid vaporizer, the gases are cut into the reactor.

Thermal decomposition of nitric acid was investigated by seven runs of 30–50 minutes duration, taking three samples of the absorber solution during each run and analyzing for total chlorine and total nitrogen. The decomposition corresponding to each sample is calculated on the basis of the following reaction system:

Decomposition:

$$2HNO_3 = H_2O + 2NO_2 + \tfrac{1}{2}O_2$$

Absorption of nitrogen dioxide in alkaline solution:

$$2NO_2 + 2NaOH = NaNO_3 + NaNO_2 + H_2O$$

Thus each mole of nitrite ions found in the solution corresponds to two moles of nitric acid decomposed. The fraction of nitric acid decomposed is equal to twice the ratio of nitrite to total nitrogen content. The first run at 250° C. showed little decomposition. It should be emphasized that the total decomposition in the entire system, including the vaporizer in the connecting line, was being determined. The decomposition was noted as much faster at higher temperatures but decreased as the flow rate increased. At 350° C. and an acid flow rate of 3 g. per minute, corresponding to a vapor flow rate of 4 l./min., about 40% of the nitric acid was decomposed. The residence time of the vapor in the reactor at this flow rate was about 15 seconds. The last two runs were made at equal volumetric vapor flow rate but with different nitric acid concentrations. The decompositions for the two runs were about the same, indicating that residence time is probably the governing factor.

Our experiments at 200 to 250° C. indicate that in sodium and potassium salts the conversion of nitric acid to the nitrate salt is apparently limited to 50%. In this temperature range, the conversion approaches the limit to within a few percent and is relatively independent of the operating variables. At 350° C. the conversion is considerably lower and changes in the operating conditions have a pronounced effect. Thus it appears that each chlorine atom leaving the reactor as elemental chlorine must be accompanied in the gas phase by a nitrogen atom in some gaseous compound. HCl, $Cl_2$, NOCl, $NO_2Cl$, $HNO_3$, $NO_2$ and NO are the possible components of the exhaust gas. However, combinations of nitrogen oxide, such as $N_2O_3$ or $N_2O_4$, are not stable at the temperatures involved. $NO_2Cl$ also decomposes even at room temperature. In runs similar to runs A–J but reacting 20 and 100% hydrochloric acid with 1000 grams of 94.2 $KNO_3$–5.8 KCl and 94.1 $KNO_3$–5.9 KCl respectively, we found that 96 and 99 respectively, of the hydrogen chloride reacted with potassium nitrate to form potassium chloride. In aqueous solutions at low temperature, nitrosyl chloride is generated without liberation of oxygen. However, the conversion of nitric acid by this reaction is 75%, whereas for the reaction involving molten salts, a conversion greater than 50% has never been observed except in the presence of lithium at temperatures below 200° C. Chlorine and nitrogen dioxide therefore appear to be the products of the reaction of nitric acid with alkali metal chloride in the molten salt solutions. This is confirmed by the detailed analysis of the products of Run Y. Nitrogen dioxide was calculated from the nitrite content accounting for 88% of the total nitrogen found in the absorber solutions for 109% of the total chlorine. The effect of the interference by nitrite in the free chlorine determination was estimated at about 5% of the free chlorine content. The experiment results of the above example are therefore consistent with the above cited equation here repeated $$2HNO_3 + Cl^- \xrightarrow{K} NO_3^- + H_2O + NO_2 + \tfrac{1}{2}Cl_2$$

Runs K and L show that lowering of the conversion rate by higher temperatures can easily be explained by the thermal decomposition of nitric acid which is quite rapid above about 300° C. Also low flow rates appear to lower the conversion as well as high inlet pressures which result from a high salt level in the reactor (Run P). Both low flow rates and high inlet pressures lengthened the residence time of the vapor in the hot inlet tube and thereby favored thermal decomposition. Other runs showed that nitrogen dioxide does not react to any appreciable amount with the molten salt mixture. The results of Run Q indicate that the conversion of nitric acid or equally the rate of reaction of chloride ions is zero at the start and builds up to a maximum so that as the concentration in the dissolved nitric acid increases so does the rate of reaction of the chloride ions until a maximum is reached. The conversion eventually decreases as the chloride gradually disappears from the solution. The experiments therefore substantiate that in a reaction of nitric acid vapor with a solution of chloride and fused alkaline metal nitrate:

(1) Nitric acid is transferred from the vapor phase to the liquid where it builds up to a concentration which is presumably a function of temperature, the vapor flow rate, the rate of mass transfer across the gas-liquid inner phase and of the chloride concentration in the melt.

(2) The dissolved nitric acid also reacts with the chloride ions:

$$HNO_3 + Cl^- \rightleftharpoons NO_3^- + HCl$$

This reaction which involves the transfer of a proton from one ion to another is probably reversible with both the forward and reverse reaction proceeding at a fast rate.

(3) Some of the hydrogen chloride formed by the above reaction reacts with more nitric acid:

$$HCl + HNO_3 \rightarrow H_2O + NO_2 + \tfrac{1}{2}Cl_2$$

This reaction probably also occurs in the liquid and not in the gas phase. The high conversions observed in the reaction between hydrochloric acid and fused nitrate salt make it seem unlikely that any hydrogen chloride could escape from the melt.

(4) Finally, a small fraction of both the chlorine and the nitrogen dioxide may react with the molten salt and the final net result would simply be the complete decomposition of the nitric acid.

It will thus be apparent that all of the recited objects and advantages recited for the invention and process have been illustrated and explained as obtainable in a highly efficient and practical manner so that all of the objects, recited features and advantages have been achieved.

Thus having described our invention, we claim:

1. A process of producing alkali metal nitrates from alkali metal chlorides comprising dissolving alkali metal chloride into molten alkali metal nitrate, simultaneously separately flowing nitric acid through the molten alkali metal nitrate to react with the alkali metal chloride dissolved therein to form additional alkali metal nitrate and a gaseous product including elemental chlorine, and separately collecting the gaseous product and molten alkali metal nitrate.

2. A process of producing alkali metal nitrates from alkali metal chlorides comprising forming a heated slurry of molten alkali metal chloride and alkali metal nitrate, and adding gaseous nitric acid to react with the alkali metal chloride of said slurry while maintaining the temperature of the slurry below that at which the nitric acid readily thermally decomposes and sufficiently high that the reaction proceeds rapidly to completion to form additional alkali metal nitrate and elemental chlorine.

3. A process of producing alkali metal nitrate from the corresponding alkali metal chloride comprising the steps of separately dissolving nitric acid and alkali metal chloride into a larger mass of molten alkali metal nitrate which has been heated to a temperature at which the alkali metal chloride reacts with nitric acid and below the temperature at which the nitric acid readily thermally decomposes so as to convert the alkali metal chloride and nitric acid to alkali metal nitrate and elemental chlorine.

4. A process of producing alkali metal nitrate from the corresponding alkali metal chloride comprising the steps of separately dissolving alkali metal chloride and nitric acid into a larger mass of molten alkali metal nitrate, maintaining the mass at a temperature above about 200° C. and below that at which nitric acid readily thermally decomposes such that at the operating pressure the said alkali metal chloride and nitric acid are rapidly converted as they intimately mix in the mass to alkali metal nitrate and a gas comprising essentially elemental chlorine, nitrogen dioxide and water, collecting the gas substantially as fast as it forms, and separating the chlorine therefrom.

5. The process of claim 4 wherein the temperature of the mass is held between about 310° and 350° C. and the pressure is atmospheric.

6. The process of claim 4 wherein the alkali metal chloride is less than 15 mole percent by weight of the alkali metal chloride and nitrate mixture.

7. The process of claim 4 wherein the nitric acid is added as hot vapors mixed with steam to a 60–70% concentration.

8. A process of producing elemental chlorine and potassium nitrate from potassium chloride and nitric acid comprising dissolving solid potassium chloride particles into the top of a larger mass of molten potassium nitrate to form a slurry thereof, simultaneously countercurrent flowing gaseous nitric acid through the forming slurry of potassium chloride and molten potassium nitrate to react with the potassium chloride, maintaining the slurry at a temperature which is below that at which the nitric acid readily decomposes and sufficiently above room temperature that the potassium chloride and nitric acid are rapidly converted to potassium nitrate and a gaseous product including elemental chlorine as they intimately mix in the slurry, collecting the gaseous product and a corresponding amount of potassium nitrate as they are formed.

9. A process of producing alkali metal nitrate from alkali metal chloride comprising the steps of dissolving finely divided alkali metal chloride into a continuously circulating stream of molten alkali metal nitrate maintained at a pressure of at least one atmosphere and a temperature below that at which nitric acid readily thermally decomposes at said pressure, flowing gaseous nitric acid countercurrent through a portion of said stream to contact the dissolving alkali metal chloride and form therewith molten alkali metal nitrate and a gaseous product, collecting the gaseous product, and removing a portion of molten alkali metal nitrate from the portion of the stream beyond the counterflow of gaseous nitric acid.

10. A process of producing alkali metal nitrate and chlorine from alkali metal chloride and nitric acid comprising the steps of adding finely divided alkali metal chloride into a continuous streaming of molten alkali metal nitrate so as to dissolve therein and form a mixture which melts at a temperature below that at which nitric acid readily thermally decomposes, maintaining the mixture at said temperature and flowing gaseous nitric acid countercurrent through a portion of said stream to contact the alkali metal chloride which is thus dissolved in the molten alkali metal nitrate so as to form therewith additional alkali metal nitrate and a gaseous product comprising elemental chlorine, collecting the gaseous product, and removing molten alkali metal nitrate from the portion of the stream between the entrance of gaseous nitric acid and the adding of finely divided alkali metal chloride into the stream.

11. A process of producing alkali metal nitrate from alkali metal chloride comprising the steps of adding finely divided alkali metal chloride into a circulating stream of molten alkali metal nitrate to form therewith a molten salt mixture, maintaining the mixture at a temperature which is below 350° C. and one at which the solid alkali metal chloride rapidly dissolves into the molten salt mixture, flowing gaseous nitric acid countercurrent through a portion of said stream to have contact with the thus intimately mixed alkali metal chloride and maintaining said temperature sufficiently high that said nitric acid and alkali metal chloride as they contact rapidly form alkali metal nitrate and a gaseous product comprising elemental chlorine and substantially free of chlorine containing compounds, collecting the gaseous product, separating out the chlorine, and removing molten alkali metal nitrate from the portion of the stream beyond the entrance of gaseous nitric acid into said stream at a rate so as to maintain the stream of molten alkali metal nitrate at a near constant level.

12. A process of manufacturing alkali metal nitrates having elemental chlorine as the principal by product which comprises adding finely divided solid alkali-metal chloride to the top of a column comprising a molten salt mixture of alkali metal chloride and alkali metal nitrate while causing gaseous nitric acid to flow countercurrent through the column so as to be dissolved therein and form with the alkali metal chloride, alkali metal nitrate and a gaseous product having a high concentration of elemental chlorine, removing the gaseous product collecting at the top of the column substantially as rapidly as it is formed, and withdrawing a molten salt product from the base of the column comprising alkali metal nitrate.

13. The process claimed in claim 12 wherein the gaseous product also contains nitrogen oxides and water.

14. A method of producing alkali metal nitrate which comprises the steps of separately dissolving solid alkali metal chloride and nitric acid vapors into molten alkali metal nitrate at a temperature below that at which the nitric acid thermally decomposes and sufficiently high that the alkali metal chloride and nitric acid rapidly react in the molten alkali metal nitrate to form additional alkali metal nitrate and a gaseous product comprising essentially elemental chlorine, nitrogen oxide and water, collecting the gaseous product, separating out the elemental chlorine therefrom, and also removing a portion of the molten alkali metal nitrate approximating that being formed in the reaction.

15. A method of producing alkali metal nitrate which comprises the steps of continuously separately dissolving solid alkali metal chloride and nitric acid vapors into molten alkali metal nitrate at a temperature below that at which the nitric acid readily thermally decomposes and above 200° C. such that at the operating pressure the alkali metal chloride and nitric acid rapidly react in the molten alkali metal nitrate to form alkali metal nitrate and a gaseous product comprising essentially elemental chlorine, nitrogen oxide and water, removing the gaseous product as rapidly as it is formed, separating out the chlorine therefrom, and removing a portion of the molten alkali metal nitrate approximating that being formed in the reaction.

16. The method claimed in claim 15 wherein the gaseous product after separation out of the chlorine is reformed to nitric acid and returned to the molten alkali metal nitrate with additional amounts of nitric acid.

17. The method claimed in claim 15 wherein the solid alkali metal chloride is dissolved into the molten alkali metal nitrate at a rate to maintain a mixture which melts at a temperature below that at which the nitric acid thermally decomposes.

18. The method claimed in claim 15 wherein the solid alkali metal chloride is added at a rate to comprise from about 6 to 15 mole percent of the alkali metal chloride and nitrate mixture.

19. The method claimed in claim 15 wherein the temperature of the reaction is maintained between about 310° and 350° C. and at atmospheric pressure.

20. The method claimed in claim 15 wherein the temperature of the reaction is maintained between about 200° C. and 310° C. and at a pressure greater than 1 atmosphere.

21. The method claimed in claim 15 wherein the nitric acid comprises a 60–70% concentration of $HNO_3$ in steam.

22. The method claimed in claim 15 wherein the nitric acid is diluted in water and the reaction caused to take place at a pressure greater than one atmosphere.

23. The method claimed in claim 15 wherein the nitric acid and water are added in liquid form, the heat of the molten alkali metal nitrate rapidly vaporizing the same.

References Cited

UNITED STATES PATENTS

| | | | |
|---|---|---|---|
| 2,535,989 | 12/1950 | Stengel | 23—102 |
| 2,959,463 | 11/1960 | Stern | 23—102 |
| 3,210,153 | 10/1965 | Maruloo et al. | 23—102 |

OTHER REFERENCES

APC 292, 742 July 1943, Beck et al.
APC 393, 258 July 1943, Beck et al.

OSCAR R. VERTIZ, *Primary Examiner.*

A. GREIF, *Assistant Examiner.*